No. 894,930. PATENTED AUG. 4, 1908.
J. L. ZANE.
SPOKE TIGHTENER.
APPLICATION FILED JUNE 27, 1907.
FIG_1_
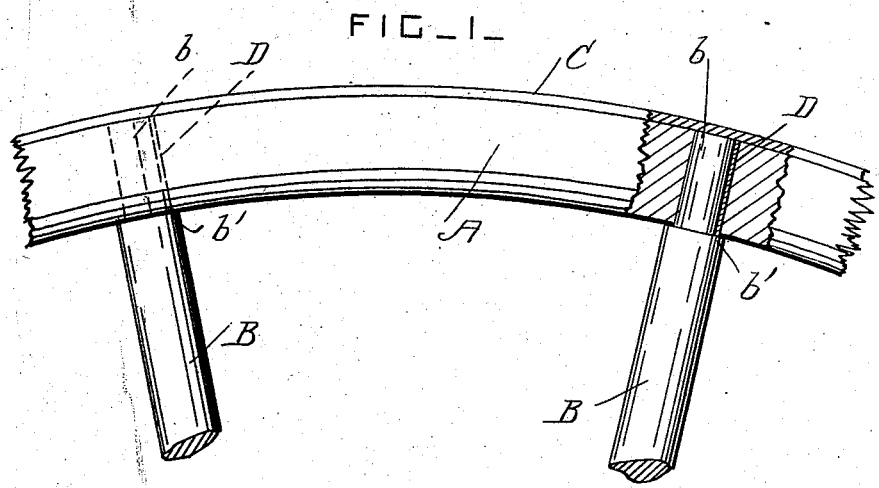
FIG_2_
FIG_3_
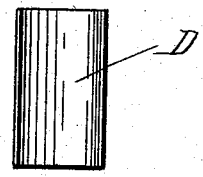
WITNESSES:
L. B. Middleton
C. E. Brown.
INVENTOR
James L. Zane
BY Herbert W. T. Jenner.
Attorney

UNITED STATES PATENT OFFICE.

JAMES L. ZANE, OF PULASKI, IOWA, ASSIGNOR OF ONE-HALF TO JOEL W. HUNT, OF PULASKI, IOWA.

SPOKE-TIGHTENER.

No. 894,930.  Specification of Letters Patent.  Patented Aug. 4, 1908.

Application filed June 27, 1907. Serial No. 381,149.

*To all whom it may concern:*

Be it known that I, JAMES L. ZANE, a citizen of the United States, residing at Pulaski, in the county of Davis and State of Iowa, have invented certain new and useful Improvements in Spoke-Tighteners; and I do hereby declare the following to be a full, clear, and exact description of the invention, such as will enable others skilled in the art to which it appertains to make and use the same.

This invention relates to devices for tightening the spokes in the fellies of wheels after the wheel has been in use; and it consists in the novel construction and combination of the parts hereinafter fully described and claimed.

In the drawings, Figure 1 is a side view partly in section showing portions of a wheel felly, tire and two spokes. Fig. 2 is a detail plan view of one bushing. Fig. 3 is a front view of the same.

A is a portion of a wheel felly.

B are portions of the spokes the end portions $b$ of which are fitted into holes in the felly in any approved manner.

C is a portion of the tire.

D is a bushing formed of a trough-shaped piece of metal. These bushings are stamped out of thin sheet metal and are made of different sizes and widths to suit different wheels. When the spoke has become loose the tire is removed and one of these bushings is driven into the space between the end portion $b$ of the spoke and the hole in the felly. When all the spokes which require to be tightened have been treated in this manner, the tire is replaced so that the bushings are retained in position, as the shoulder $b'$ on the spoke prevents them from sliding out of the holes on the other side of the felly from the tire.

What I claim is:

The combination, with a wheel felly provided with a tenon hole, of a spoke having a shoulder which bears against the felly and a tenon which engages with the said hole, a tightener comprising a trough-shaped plate of thin sheet metal of the same thickness all over and of the same length as the said hole, and a tire which retains the said tightener in the said hole at any desired point around the said tenon.

In testimony whereof I have affixed my signature in the presence of two witnesses.

JAMES L. ZANE.

Witnesses:
WILLIAM T. STEVIG,
C. C. KITTERMAN.